Patented Oct. 20, 1925.

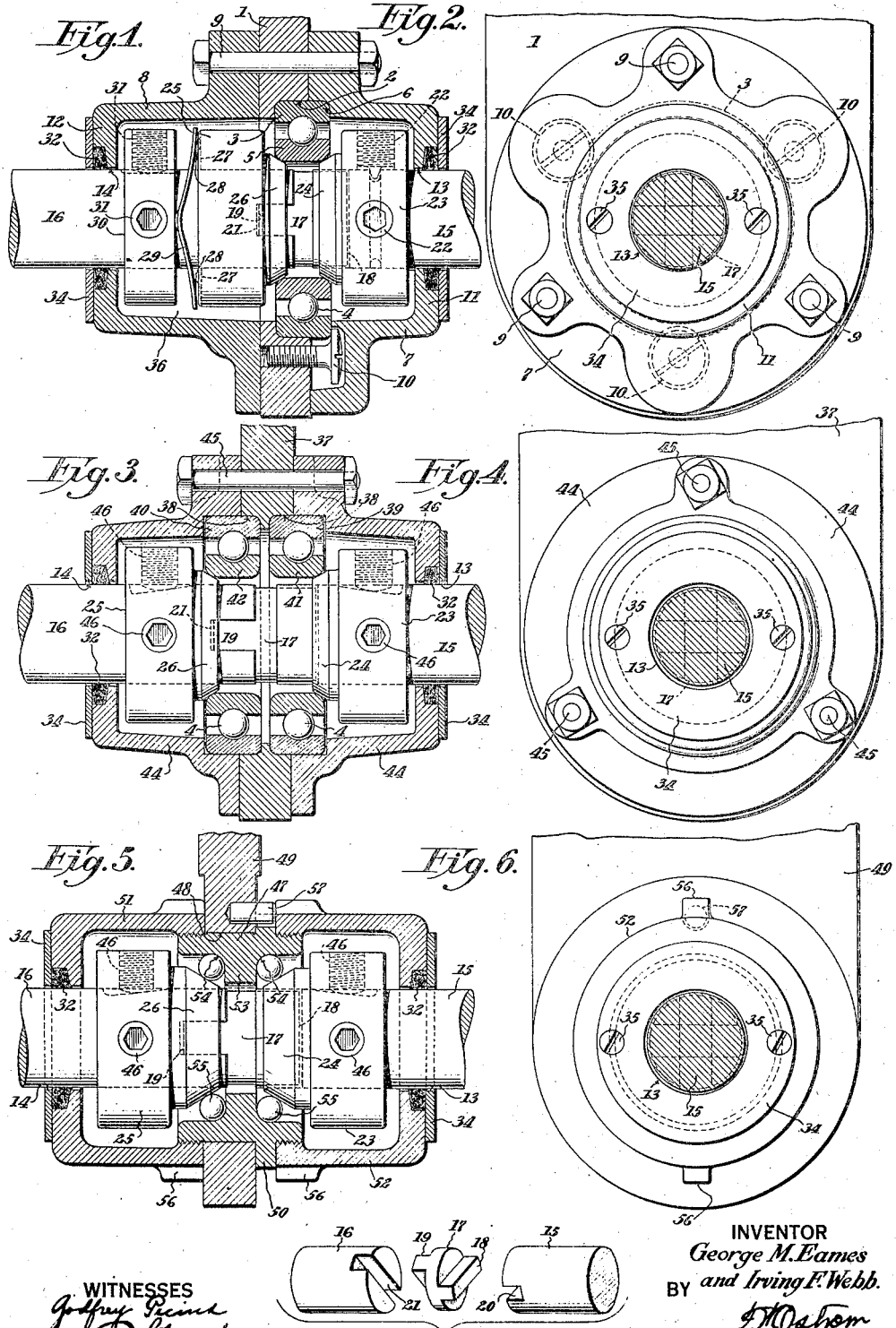

1,557,569

UNITED STATES PATENT OFFICE.

GEORGE M. EAMES, OF BRIDGEPORT, CONNECTICUT, AND IRVING F. WEBB, OF ELIZABETH, NEW JERSEY, ASSIGNORS TO THE SINGER MANUFACTURING COMPANY, OF ELIZABETH, NEW JERSEY, A CORPORATION OF NEW JERSEY.

SECTIONAL SHAFT BEARING AND COUPLING.

Application filed March 29, 1924. Serial No. 702,731.

*To all whom it may concern:*

Be it known that we, GEORGE M. EAMES and IRVING F. WEBB, residing, respectively, at Bridgeport, in the county of Fairfield and State of Connecticut, and at Elizabeth, in the county of Union and State of New Jersey, have invented certain new and useful Improvements in Sectional Shaft Bearings and Couplings, of which the following is a specification, reference being had therein to the accompanying drawings.

This invention relates to improvements in shaft-bearings and has for its primary object to provide an improved sectional-shaft bearing and coupling, whereby a line-shafting comprising a plurality of shaft-sections will rotate smoothly in unison and with a minimum of friction regardless of an imperfect alinement of the shaft-sections.

A further object of this invention is to provide a shaft-bearing facilitating the installation of line-shafting comprising a plurality of shaft-sections disposed in end to end relationship.

The invention has for another object to provide an efficient housing for a combined sectional-shaft bearing and coupling.

Other objects of the invention will be apparent from the following description and claims.

In a preferred embodiment of the invention, a stationary bearing-support, which may be in the form of a hanger, bracket or standard, is provided with a seat for the outer ring of a ball-bearing clamped to its seat by one member of a two-part cylindrical bearing-housing suitably secured upon the bearing-support. Projecting into the bearing-housing through enlarged alined apertures provided in the housing members are shaft-sections disposed in end-to-end relationship, although not necessarily in true alinement, said shaft-sections being connected for unison rotation by a suitable form of universal-coupling. Carried by the adjacent shaft-ends, within the housing are bearing-cones sustained for universal angular positioning movements upon and for rotary movement with the inner ring of said ball-bearing. Preferably one of said bearing-cones is yieldingly held in engagement with the ball-bearing to automatically insure the necessary frictional engagement with said inner ring, although it may obviously be secured in its proper position. The bearing-housing may be packed with a lubricant for the shaft-bearings and couplings, and serves to protect the bearing against injurious extraneous matter.

Obviously, instead of a single ball-bearing, there may be employed a separate ball-bearing to sustain each of the shaft-sections and instead of sustaining the bearing-cones upon the inner ring of a ball-bearing, they may directly engage the bearing-balls and thus constitute inner rings, all within the spirit and scope of the present invention in its broader aspects.

Referring to the drawings, Fig. 1 is a longitudinal section of a preferred embodiment of the housed sectional-shaft bearing and coupling constituting the present invention, and Fig. 2 is an end elevation thereof. Figs. 3 and 4 and Figs. 5 and 6 are views similar to Figs. 1 and 2, of different embodiments of the invention. Fig. 7 is a perspective view of portions of the shaft-sections and a common form of universal coupling therefor.

Referring to the drawings and more particularly to the embodiment of the invention illustrated in Figs. 1 and 2, the bearing is shown as sustained by a stationary support 1, the position of which may, however, be adustable in any suitable manner. This bearing-support 1 may be of the depending hanger, wall-bracket or floor-standard type, the present improvement being adaptable to any form of line-shafting. The support 1 is apertured to provide a shouldered seat 2 for the outer ring 3 of a ball-bearing, which ring 3 is grooved on its inner surface for the reception of a series of bearing balls 4 held in position by an inner grooved ring 5. This ball-bearing may, however, be of any suitable and well known type and is shown as clamped to its seat 2 by an internal shoulder 6 formed on one member 7 of a two-part bearing housing, disposed at one side of the support 1 and of which the other member 8 is disposed upon the opposite side of the support 1, the two housing-members being secured upon said support by bolts, as 9. The ball-bearing ring 3 is shown as further secured by the heads of screws 10 threaded into the support 1, but these screws primarily serve to retain the ball-bearing in its seat upon the support to aid an initial assembling of the parts and are unessential after the housing is clamped into position.

The end walls 11 and 12 of the housing-members 7 and 8 are provided with enlarged, alined shaft-apertures as 13 and 14 through which project the shaft-sections 15 and 16, connected by a universal coupling comprising a coupling-washer 17 provided upon its opposite faces with transverse diametrical ribs 18 and 19 entering slots as 20 and 21 formed in the ends of the respective shaft-sections 15 and 16. While the shaft-sections are disposed in end to end relationship, they need not necessarily be in true alinement as will hereinafter appear. The coupling-washer 17 is preferably disposed within the inner ring of the ball-bearing, its function being well understood.

Secured by means of set-screws as 22 upon the shaft-sections 15 within the housing is a collar 23, provided with an inwardly projecting bearing-cone 24 having a universal angular-movement seat upon one of the rounded inner edges of the ring 5. The other shaft-section 16 carries a similar collar 25 provided with an oppositely directed bearing-cone 26 engaging the other rounded edge of the ring 5 for the same purpose. Instead, however, of securing the collar 25 upon its shaft-section, it is preferred to slidingly mount the same thereupon and yieldingly hold it in position. To this end, the collar is provided upon its end face opposite to the cone 26 with a series of positioning-grooves, as 27, entered by lugs, as 28, of a bent spring-washer 29 interposed between the collar 25 and a collar 30 adjustably secured upon the shaft-section 16 by set-screws, as 31. By means of this construction, the cones may be caused to engage the ball-bearing ring with a predetermined pressure, whereby the cone causes rotation of the inner ring but is free to assume different angular positions thereupon.

To provide for the angular movement of the shaft-sections, the housing-apertures 13 and 14 are enlarged to afford the necessary shaft-clearance, the escape of lubricant through said apertures being prevented by suitable yielding packing rings 32 clamped in position adjacent the apertures 13 and 14, by caps 34 secured by screws as 35 upon the housing members. It is to be understood that the housing members afford a lubricant compartment 36 and that they protect the bearing and coupling parts described.

Instead of disposing the sectional-shaft bearing cones 24, 26, to engage the same ball-bearing ring as in Fig. 1 of the drawings, these cones may be caused to coact with individual ball-bearing rings as shown in Fig. 3. In the embodiment of the invention illustrated in Figs. 3 and 4, a stationary support 37 is apertured to provide adjacent shouldered seats 38 for the outer rings 39 and 40 of ball-bearings, of which the respective inner rings 41 and 42 individually sustain the bearing-cones 24, 26. The rings 39 and 40 are held in their seats by housing members 44 clamped upon the support 37 by bolts, as 45. In Fig. 3, both of the cone-carrying collars 23 and 25 are shown as fixed upon their shaft-sections by set-screws, as 46, but it is evident that one of the cones may be slidingly mounted upon the shaft as illustrated in Fig. 1, or that the sliding cone of Fig. 1 may be secured in fixed position upon its shaft-section.

Another embodiment of the invention is illustrated in Figs. 5 and 6, wherein the bearing-cones 24, 26, themselves constitute the inner rings of ball-bearings of which an outer ring 47 forms the complemental member. The ring 47 is secured in a seat 48 provided in an apertured bearing-support 49 and has a peripheral flange 50, clamped against the side of the bearing-support by means of one member 51 of a bearing-housing threaded upon the ring 47 on the opposite side of the bearing-support. Threaded upon the ring 47 adjacent the flange 50 is the other member 52 of the bearing-housing. The ring 47 is provided with an inwardly projecting rib 53 surrounding the shaft-coupling 17 described, which rib 53 affords curved raceways 54 upon opposite sides thereof for two series of balls 55. It will be apparent that relative angular positioning movements of the shaft-sections in this form of construction are permitted as in those previously described. In order to facilitate the threading of the housing-members 51, 52, upon the ring 47, they are preferably provided with a plurality of peripheral manipulating lugs, as 56, while the ring 47 may be secured against turning within the support-seat 48 by the action of a locking-pin 57 entering alined apertures provided in the flange 50 and the support 49. In the embodiments of the invention illustrated in Figs. 1 and 3, it is to be understood that the bearing-cones 24 and 26 are designed to rotate with the inner ball-bearing ring and not for axial rotation relative thereto. The inner ball-bearing rings serve merely to sustain the several shaft-sections in universal angular relation with respect to each other, the ball-bearings providing for anti-friction axial rotation of the shafts.

By means of the present improvement, a plurality of shaft-sections may be readily installed to provide a line shafting and even though said sections are not in perfect alinement because of ever present imperfect workmanship, the shaft-sections will run smoothly in their lubricated, housed bearings and at the same time take up end-thrusts which may be imposed upon said shafting.

Having thus set forth the nature of the invention, what we claim herein is—

1. In a sectional-shaft bearing and coupling, in combination, a bearing-support, a shaft-bearing sustained by said support, a plurality of shaft-sections, a universal-coupling connecting said shaft-sections adjacent said bearing, and a bearing-cone mounted upon the end of one of said shaft-sections sustained by said shaft-bearing for universal-angular shaft-positioning movement.

2. In a sectional-shaft bearing and coupling, in combination, a bearing-support, a shaft-bearing sustained by said support, a plurality of shaft-sections, a universal-coupling connecting said shaft-sections adjacent said bearing, and a bearing cone mounted upon each of said shaft-sections sustained for universal angular movement upon said shaft-bearing.

3. In a sectional-shaft bearing and coupling, in combination, a bearing-support, a shaft-bearing sustained by said support, a plurality of shaft-sections, a universal-coupling connecting said shaft-sections adjacent said bearing, a bearing-cone mounted upon one of said shaft-sections for movement endwise thereof, and means yieldingly maintaining said bearing-cone in frictional engagement with said bearing for universal angular movement thereupon.

4. In a sectional-shaft bearing and coupling, in combination, a bearing-support, a shaft-bearing sustained by said support, a plurality of shaft-sections, a universal-coupling connecting said shaft-sections adjacent said bearing, a bearing-cone mounted upon one of said shaft-sections for sliding movement endwise thereof, means yieldingly maintaining said bearing-cone in engagement with said bearing for universal angular movement thereupon, and means permitting universal angular movement of the other shaft-section.

5. In a sectional shaft-bearing and coupling, in combination, a bearing-support, a plurality of shaft-sections, a universal-coupling for said shaft-sections compelling unison rotation thereof, coacting bearing members adjacent said coupling sustaining one of said shaft-sections in universal angular positions, and a spring yieldingly maintaining the effective engagement of said bearing members.

6. In a sectional-shaft bearing and coupling, in combination, a bearing-support, a plurality of shaft-sections, a universal-coupling for said shaft-sections compelling unison rotation thereof, a universal angular-movement seat upon said support for one of said shaft-sections including a ball-bearing and coacting member, and a spring for maintaining effective the bearing engagement between said ball-bearing and member.

7. In a sectional-shaft bearing and coupling, in combination, a bearing-support, a bearing-housing, sectional-shaft ends projecting within said housing, a universal-coupling between said shaft ends disposed within said housing, a ball-bearing surrounding said coupling sustained by said bearing-support, and universal angular-movement seats for said shaft-sections upon said ball-bearing.

8. In a sectional-shaft bearing and coupling, in combination, a bearing-support, a bearing-housing sustained by said support, a shaft-bearing disposed within said housing, shaft-sections projecting within said housing, a universal coupling between said shaft-sections, and a bearing-cone carried by one of said shaft-sections within the housing sustained for universal angular positioning movement upon said bearing.

9. In a sectional-shaft bearing and coupling, in combination, a bearing-support, a bearing-housing sustained by said support, a shaft-bearing disposed within said housing, contiguous shaft-sections within said housing, a universal coupling for said shaft-sections within said housing, and oppositely directed bearing cones carried by said shaft-sections within said housing and sustained for universal angular shaft-positioning movements upon said bearing.

10. In a sectional-shaft bearing and coupling, in combination, a bearing-support, a plurality of shaft-sections disposed in end to end relationship, a universal-coupling between said shaft-sections, a ball-bearing sustained by said support comprising an outer race-ring and an inner race-ring ball spaced from said outer ring, and means carried by said shaft adjacent said coupling for sustaining one of said shaft-sections upon said inner race-ring for universal angular shaft-positioning movements relatively thereto.

11. In a sectional-shaft bearing and coupling, in combination, a stationary bearing-support, an outer race-ring rigidly sustained by said support, an inner race-ring, a series of bearing balls sustaining said inner ring for axial rotation with respect to said outer ring, a shaft-section having a universal angular movement seat upon said inner race-ring, a second shaft-section, and a universal coupling for said shaft-sections adjacent said inner race-ring.

12. In a sectional-shaft bearing and coupling, in combination, a stationary bearing-support, an outer race-ring rigidly sustained by said support, an inner race-ring, a series of bearing balls confining said inner race-ring to axial rotation with respect to said outer race-ring, a shaft-section having a universal movement seat upon said inner race-ring, a second shaft-section, and a universal coupling for said shaft-sections disposed within said inner race-ring.

In testimony whereof, we have signed our names to this specification.

GEORGE M. EAMES.
IRVING F. WEBB.